(12) United States Patent
Nakamori

(10) Patent No.: US 10,969,648 B2
(45) Date of Patent: Apr. 6, 2021

(54) ELECTROPHORETIC DISPLAY DEVICE AND ELECTRONIC APPARATUS

(71) Applicant: E Ink Corporation, Billerica, MA (US)

(72) Inventor: Michio Nakamori, Suwa (JP)

(73) Assignee: E Ink Corporation, Billerica, MA (US)

( * ) Notice: Subject to any disclaimer, the term of this patent is extended or adjusted under 35 U.S.C. 154(b) by 217 days.

(21) Appl. No.: 16/228,869

(22) Filed: Dec. 21, 2018

(65) Prior Publication Data

US 2019/0196293 A1 Jun. 27, 2019

(30) Foreign Application Priority Data

Dec. 22, 2017 (JP) .............................. JP2017-245971

(51) Int. Cl.
| | |
|---|---|
| *G02F 1/1675* | (2019.01) |
| *G02F 1/167* | (2019.01) |
| *H04M 1/03* | (2006.01) |
| *G02F 1/16766* | (2019.01) |
| *G02F 1/1679* | (2019.01) |
| *G02F 1/16755* | (2019.01) |
| *G02F 1/1681* | (2019.01) |

(52) U.S. Cl.
CPC ............ *G02F 1/1675* (2019.01); *G02F 1/167* (2013.01); *G02F 1/16766* (2019.01); *H04M 1/03* (2013.01); *G02F 1/1679* (2019.01); *G02F 1/1681* (2019.01); *G02F 1/16755* (2019.01); *G02F 2001/1678* (2013.01)

(58) Field of Classification Search
None
See application file for complete search history.

(56) References Cited

U.S. PATENT DOCUMENTS

| | | | |
|---|---|---|---|
| 5,961,804 | A | 10/1999 | Jacobson |
| 6,017,584 | A | 1/2000 | Albert |
| 6,120,588 | A | 9/2000 | Jacobson |
| 6,120,839 | A | 9/2000 | Comiskey |
| 6,262,706 | B1 | 7/2001 | Albert |
| 6,262,833 | B1 | 7/2001 | Loxley |
| 6,300,932 | B1 | 10/2001 | Albert |
| 6,323,989 | B1 | 11/2001 | Jacobson |

(Continued)

FOREIGN PATENT DOCUMENTS

JP 2013160855 A 8/2013

OTHER PUBLICATIONS

Korean Intellectual Property Office, PCT/US2018/067006, International Search Report and Written Opinion, dated Apr. 12, 2019. dated Apr. 12, 2019.

*Primary Examiner* — Robert E. Tallman
(74) *Attorney, Agent, or Firm* — Ioannis Constantinides

(57) ABSTRACT

An electrophoretic display device capable of having retention property of electrophoretic particles and exhibiting excellent display characteristics, and an electronic apparatus. The electrophoretic display device includes an element substrate, a counter substrate disposed to face counter substrate, a molecule X provided between the element substrate and the counter substrate, an electrophoretic dispersion liquid containing electrophoretic particles and a dispersion medium, wherein the electrophoretic dispersion liquid is disposed between counter substrate and molecule X, wherein molecule X includes an aromatic ring having a cyclic structure, for example, benzene, toluene, xylene, and the like.

13 Claims, 12 Drawing Sheets

(56) References Cited

U.S. PATENT DOCUMENTS

| | | |
|---|---|---|
| 6,377,387 B1 | 4/2002 | Duthaler |
| 6,515,649 B1 | 2/2003 | Albert |
| 6,538,801 B2 | 3/2003 | Jacobson |
| 6,580,545 B2 | 6/2003 | Morrison |
| 6,652,075 B2 | 11/2003 | Jacobson |
| 6,693,620 B1 | 2/2004 | Herb |
| 6,721,083 B2 | 4/2004 | Jacobson |
| 6,727,881 B1 | 4/2004 | Albert |
| 6,822,782 B2 | 11/2004 | Honeyman |
| 6,831,771 B2 | 12/2004 | Ho |
| 6,870,661 B2 | 3/2005 | Pullen |
| 6,914,713 B2 | 7/2005 | Chung |
| 7,002,728 B2 | 2/2006 | Pullen |
| 7,005,468 B2 | 2/2006 | Zang et al. |
| 7,038,655 B2 | 5/2006 | Herb |
| 7,052,766 B2 | 5/2006 | Zang |
| 7,110,162 B2 | 9/2006 | Wu |
| 7,113,323 B2 | 9/2006 | Ho |
| 7,141,688 B2 | 11/2006 | Feng |
| 7,142,351 B2 | 11/2006 | Chung |
| 7,170,670 B2 | 1/2007 | Webber |
| 7,180,649 B2 | 2/2007 | Morrison |
| 7,226,550 B2 | 6/2007 | Hou |
| 7,230,750 B2 | 6/2007 | Whitesides |
| 7,230,751 B2 | 6/2007 | Whitesides |
| 7,236,290 B1 | 6/2007 | Zhang |
| 7,247,379 B2 | 7/2007 | Pullen |
| 7,277,218 B2 | 10/2007 | Hwang |
| 7,286,279 B2 | 10/2007 | Yu |
| 7,312,916 B2 | 12/2007 | Pullen |
| 7,375,875 B2 | 5/2008 | Whitesides |
| 7,382,514 B2 | 6/2008 | Hsu |
| 7,390,901 B2 | 6/2008 | Yang |
| 7,411,720 B2 | 8/2008 | Honeyman et al. |
| 7,473,782 B2 | 1/2009 | Yang |
| 7,532,388 B2 | 5/2009 | Whitesides et al. |
| 7,532,389 B2 | 5/2009 | Li |
| 7,572,394 B2 | 8/2009 | Gu |
| 7,576,904 B2 | 8/2009 | Chung |
| 7,580,180 B2 | 8/2009 | Ho |
| 7,679,814 B2 | 3/2010 | Paolini, Jr. |
| 7,746,544 B2 | 6/2010 | Comiskey |
| 7,767,112 B2 | 8/2010 | Hou |
| 7,848,006 B2 | 12/2010 | Wilcox |
| 7,903,319 B2 | 3/2011 | Honeyman |
| 7,951,938 B2 | 5/2011 | Yang |
| 8,018,640 B2 | 9/2011 | Whitesides |
| 8,115,729 B2 | 2/2012 | Danner |
| 8,119,802 B2 | 2/2012 | Moonen et al. |
| 8,199,395 B2 | 6/2012 | Whitesides |
| 8,257,614 B2 | 9/2012 | Gu |
| 8,270,064 B2 | 9/2012 | Feick |
| 8,305,341 B2 | 11/2012 | Arango |
| 8,361,620 B2 | 1/2013 | Zang |
| 8,363,306 B2 | 1/2013 | Du |
| 8,390,918 B2 | 3/2013 | Wilcox |
| 8,582,196 B2 | 11/2013 | Walls |
| 8,593,718 B2 | 11/2013 | Comiskey |
| 8,638,492 B2 | 1/2014 | Chen et al. |
| 8,654,436 B1 | 2/2014 | Feick |
| 8,902,491 B2 | 12/2014 | Wang |
| 8,961,831 B2 | 2/2015 | Du |
| 9,052,564 B2 | 6/2015 | Sprague |
| 9,114,663 B2 | 8/2015 | Ho |
| 9,158,174 B2 | 10/2015 | Walls |
| 9,341,915 B2 | 5/2016 | Yang |
| 9,348,193 B2 | 5/2016 | Hiji |
| 9,361,836 B1 | 6/2016 | Telfer |
| 9,366,935 B2 | 6/2016 | Du |
| 9,372,380 B2 | 6/2016 | Du |
| 9,382,427 B2 | 7/2016 | Du |
| 9,423,666 B2 | 8/2016 | Wang |
| 9,428,649 B2 | 8/2016 | Li |
| 9,557,623 B2 | 1/2017 | Wang |
| 9,664,978 B2 | 5/2017 | Arango |
| 9,670,367 B2 | 6/2017 | Li |
| 9,688,859 B2 | 6/2017 | Yezek |
| 9,726,957 B2 | 8/2017 | Telfer |
| 9,778,537 B2 | 10/2017 | Wang |
| 9,835,926 B2 | 12/2017 | Sprague |
| 9,921,452 B2 | 3/2018 | Nakamura et al. |
| 2002/0150827 A1 * | 10/2002 | Kawai .............. G02F 1/16757 430/20 |
| 2003/0048522 A1 | 3/2003 | Liang |
| 2003/0151029 A1 | 8/2003 | Hsu |
| 2003/0164480 A1 | 9/2003 | Wu |
| 2004/0030125 A1 | 2/2004 | Li |
| 2004/0085619 A1 | 5/2004 | Wu et al. |
| 2005/0012980 A1 | 1/2005 | Wilcox |
| 2008/0193769 A1 * | 8/2008 | Yanagisawa ......... C08F 283/12 428/411.1 |
| 2009/0009852 A1 | 1/2009 | Honeyman |
| 2009/0206499 A1 | 8/2009 | Whitesides |
| 2009/0225398 A1 | 9/2009 | Duthaler |
| 2010/0148385 A1 | 6/2010 | Balko |
| 2011/0217639 A1 | 9/2011 | Sprague |
| 2012/0049125 A1 | 3/2012 | Du |
| 2013/0161565 A1 | 6/2013 | Laxton |
| 2013/0193385 A1 | 8/2013 | Li |
| 2013/0244149 A1 | 9/2013 | Wang |
| 2013/0265632 A1 * | 10/2013 | Aoki ..................... G02F 1/167 359/296 |
| 2014/0011913 A1 | 1/2014 | Du |
| 2014/0078024 A1 | 3/2014 | Paolini, Jr. |
| 2014/0078573 A1 | 3/2014 | Comiskey |
| 2014/0078576 A1 | 3/2014 | Sprague |
| 2014/0078857 A1 | 3/2014 | Nelson |
| 2014/0104674 A1 | 4/2014 | Ting |
| 2014/0231728 A1 | 8/2014 | Du |
| 2014/0347718 A1 | 11/2014 | Duthaler et al. |
| 2015/0177590 A1 | 6/2015 | Laxton |
| 2015/0185509 A1 | 7/2015 | Wang |
| 2015/0241754 A1 | 8/2015 | Du |
| 2015/0301425 A1 | 10/2015 | Du |
| 2016/0170106 A1 | 6/2016 | Wang |

* cited by examiner

ELECTROPHORETIC DISPLAY DEVICE AND ELECTRONIC APPARATUS

RELATED APPLICATIONS

This application claims priority to Japanese Patent Application No. 2017-245971, filed Dec. 22, 2017, which is incorporated by reference in its entirety.

TECHNICAL FIELD

The present invention relates to an electrophoretic display device and an electronic apparatus.

BACKGROUND

An electrophoretic display device utilizing electrophoresis of particles has been known. The electrophoretic display device is advantageous in having a portability and low power consumption. In the electrophoretic display device, an image is formed on a display region by applying a voltage between a pixel electrode and a common electrode which are opposite to each other with an electrophoretic dispersion liquid containing electrophoretic particles in between to spatially move electrophoretic particles such as charged black particles or white particles. Known electrophoretic display devices include, for example, a structure where a plurality of cells (spaces) are defined by a partition between a pair of substrates and each cell seals an electrophoretic dispersion liquid containing electrophoretic particles and a dispersion medium.

More specifically, as such an electrophoretic display device, there is proposed a device in which a partition is placed between a common electrode and pixel electrodes respectively disposed on a pair of substrates, and electrophoretic dispersion liquid is sealed inside cells defined by the pixel electrodes, the common electrode and the partition.

However, when the cell is defined by the pixel electrodes, the cell common electrode and the partition, the electrodes of the pixel electrodes and the common electrode directly contact the electrophoretic dispersion liquid. Therefore, every time images are formed due to the movement of the electrophoretic particles, the electrophoretic particles come in contact with at least one of the two electrodes. As a result, since the electrophoretic particles are adsorbed (affixed) to the electrode, electrical display characteristics of the electrophoretic display device are significantly lowered.

It is to be noted that the adsorption of electrophoretic particles may occur not only on the electrode but also on the constituent material of the partition. As countermeasures against these problems, as described in Patent Literature 1, a countermeasure to suppress the adsorption of the electrophoretic particles by using a low polarity material as the constituent material and reducing an attractive force (electrostatic attractive force, van der Waals force) between the electrophoretic particles has been performed.

Patent Literature 1: Japanese Patent Application Laid-Open (JP-A) No. 2017-49552

SUMMARY OF INVENTION

However, as side effects of these countermeasures, there was a problem that the retention property of the electrophoretic particles is decreased. The retention property indicates a degree at which a display image is kept in a voltage non-applied state in which a voltage is applied between two electrodes to move electrophoretic particles to a display surface so as to form the display image and then the voltage application stops. In the voltage non-applied state, a configuration having retention property can keep the display image for a long time and the configuration having low retention property can keep the display image for a shorter time than a configuration having high retention property.

The retention property can be controlled, for example, by increasing a viscosity of an electrophoretic dispersion liquid or continuously applying a voltage. When the viscosity of the electrophoretic dispersion liquid is increased, a response time for rewriting the display image becomes long, so that display performance deteriorates. In addition, in a case of a configuration to continuously apply a voltage, power consumption is increased, so it is difficult to apply the configuration to wearable products which are restricted in terms of a mountable power supply.

An object of the invention is to provide an electrophoretic display device capable of having retention property against cells of electrophoretic particles included in an electrophoretic dispersion liquid and exhibiting excellent display characteristics, and an electronic apparatus.

An electrophoretic display device according to this application example includes a first substrate, a second substrate disposed to face the first substrate, a molecule X provided between the first substrate and the second substrate, and an electrophoretic dispersion liquid which is disposed between the first substrate and the molecule X and contains electrophoretic particles and a dispersion medium, in which the molecule X includes an aromatic ring having a cyclic structure, and the aromatic ring includes any one of benzene (phenol), toluene, xylene, mesitylene, pyridine, pyrrole, thiophene, acetophenone, aniline, anisole, benzaldehyde, benzyl alcohol, benzylamine, fluorobenzene, bromobenzene, dibromobenzene, chlorobenzene, dichlorobenzene, phenol, furfural, bromoaniline, nitrobenzene, nitrotoluene, toluidine, naphthalene, anthracene, naphthacene, pentacene, benzopyrene, chrysene, pyrene, triphenylene, corannulene, coronene, and ovalene.

According to this application example, the molecule X provided between the first substrate and the second substrate has the aromatic ring having the cyclic structure, and in these cyclic structures, electrons are delocalized. As a result, a bias (polarization) of an electron density tends to occur, so that an attractive force with positively or negatively charged electrophoretic particles becomes stronger.

However, since the attractive force works slightly stronger than an intermolecular force, a force which can move the electrophoretic particles when a display image is rewritten by application of voltage is weak. Therefore, the fixation (adsorption) of the electrophoretic particles can be suppressed and the retention property of the electrophoretic particles after the application of voltage can be kept, it is possible to provide the electrophoretic display device having the excellent display characteristics.

In the electrophoretic display device described in the application example, it is preferable that a refractive index of the molecule X is from 1.5 to 3.0.

According to this application example, since the refractive index of the molecule X is from 1.5 to 3.0, the polarization tends to occur and the polarizability can be increased. For this reason, since molecules with high polarizability are strongly attracted to positively or negatively charge electrophoretic particles, the fixation (adsorption) of electrophoretic particles can be suppressed and the retention property of the electrophoretic particles after the application of voltage can be kept, such that it is possible to provide the electrophoretic display device having the excellent display characteristics.

In the electrophoretic display device described in the application example, the molecule X is preferably arranged on the second substrate at a ratio from 1 molecule/10 nm2 to 10 molecules/10 nm2.

According to this application example, by adjusting an abundance of the molecule X to a ratio of from 1 molecule/ 10 nm2 to 10 molecules/10 nm2, the attractive force between the charged electrophoretic particles and the molecule X having the high polarizability becomes stronger. Therefore, since the retention property of the electrophoretic particles after the application of voltage can be kept, it is possible to provide the electrophoretic display device having the excellent display characteristics.

In the electrophoretic display device described in the application example, it is preferable that the electrophoretic particles include at least one color particle.

According to this application example, it is possible to provide the electrophoretic display device capable of performing a color display by allowing the electrophoretic particles to use not only achromatic particles (white particles, black particles) but also colored color particles.

In the electrophoretic display device described in this application example, it is preferable that the electrophoretic particles include the molecule X.

According to this application example, since a π-π interaction works by the molecule X included in the electrophoretic particles and the molecule X provided in the second substrate to apply the stronger attractive force than the intermolecular force, it is possible to suppress the fixation (adsorption) of the electrophoretic particles and keep the retention property of the electrophoretic particles after the application of voltage. In addition, since the π-π interaction works even between the electrophoretic particles by the molecule X included in the electrophoretic particles, the electrophoretic particles can exist densely, such that it is possible to provide the electrophoretic display device having high-contrast display characteristics.

In the electrophoretic display device described in the application example, a weight fraction of the molecule X included in the electrophoretic particles is preferably from 20% to 80%.

According to this application example, since by setting the weight fraction of the molecule X to be from 20% to 80%, the fixation (adsorption) of the electrophoretic particles can be suppressed and the retention property of the electrophoretic particles after the application of voltage can be kept, it is possible to provide the electrophoretic display device having the excellent display characteristics.

In the electrophoretic display device described in the application example, it is preferable that a protective film is provided between the second substrate and the molecule X.

According to this application example, since the protective film is provided between the second substrate and the molecule X, it is possible to address a thermal expansion and a thermal contraction of the electrophoretic dispersion liquid accompanied with a change in temperature, such that it is possible to provide the electrophoretic display device having high reliability.

An electronic apparatus according to this application example includes the electrophoretic display device described in the application example.

According to this application example, since the electrophoretic display device having the retention property of the electrophoretic particles and having the excellent display characteristics is provided, it is possible to obtain the electronic apparatus having with high performance and reliability.

BRIEF DESCRIPTION OF THE DRAWINGS

The invention will be described with reference to the accompanying drawings, wherein like numbers reference like elements.

DESCRIPTION

Hereinafter, embodiments of the invention will be described with reference to the accompanying drawings. In each of the following figures, a scale of each layer and each member is made different from the actual scale in order to recognize each layer and each member.

Firstly, prior to describing the electrophoretic display device according to the invention will be described an electronic apparatus comprising the electrophoretic display device according to the invention (the electronic apparatus according to the invention).

Figure 1:
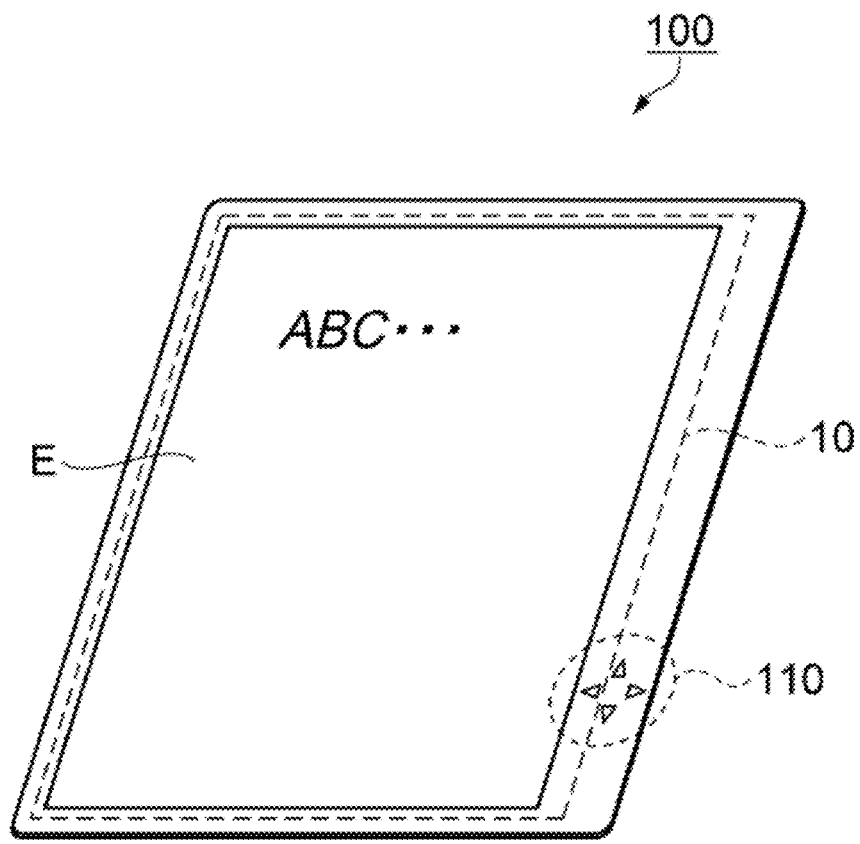
FIG. 1 is a perspective view showing an embodiment of the electronic apparatus onboard the electrophoretic display device according to the invention.

FIG. 1 is a perspective view showing an embodiment of an electronic apparatus onboard the electrophoretic display device according to the invention. As shown in FIG. 1, an electronic apparatus 100 includes an electrophoretic display device 10, and an interface for operating the electronic apparatus 100. This interface is specifically, for example, an operation unit 110 which includes a switch and the like.

The electronic apparatus 100 includes an electrophoretic display device 10 and is a display module having a display region E. The display region E includes a plurality of pixels, and an image is displayed in the display region E by electrically controlling these pixels.

Besides the electronic paper (EPD: Electronic Paper Display) shown in FIG. 1, the electronic apparatus 100 having the electrophoretic display device 10 is applicable to watches, writable devices, smart phones, tablet terminals, televisions, view finder type or monitor direct view type of video tape recorder, car navigation systems, pagers, electronic organizers, electronic calculators, electronic newspapers, word processors, personal computers, workstations, a television telephones, POS terminals, touch panels, or the like.

Next, a first embodiment of the electrophoretic display device 10 (the electrophoretic display device according to the invention) included in the electronic apparatus 100 will be described referring to FIG. 2 to FIG. 7.

Figure 2:
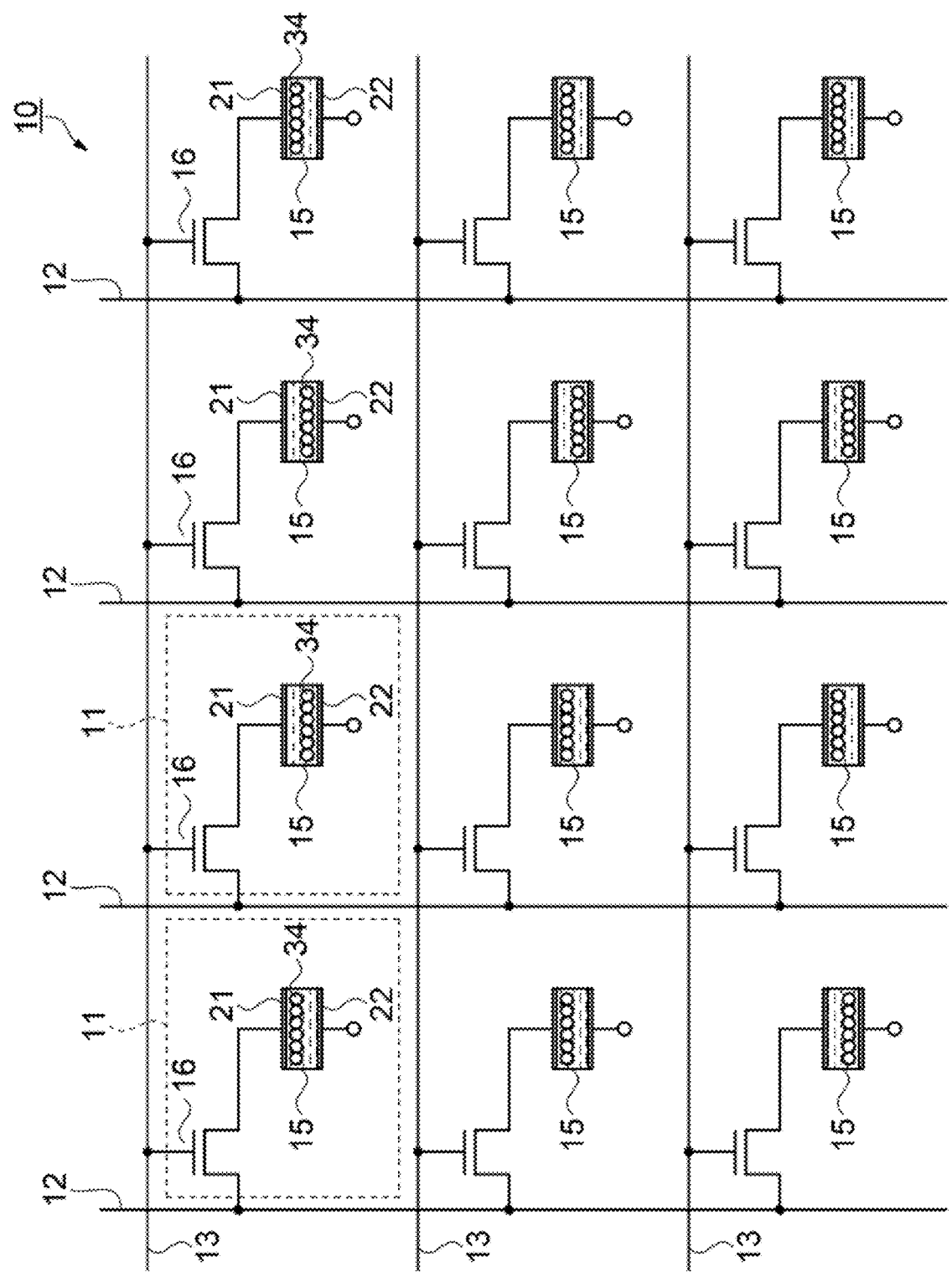
FIG. 2 is an equivalent circuit diagram showing a first embodiment of the electrical configuration of the electrophoretic display device according to the invention.
Figure 3:
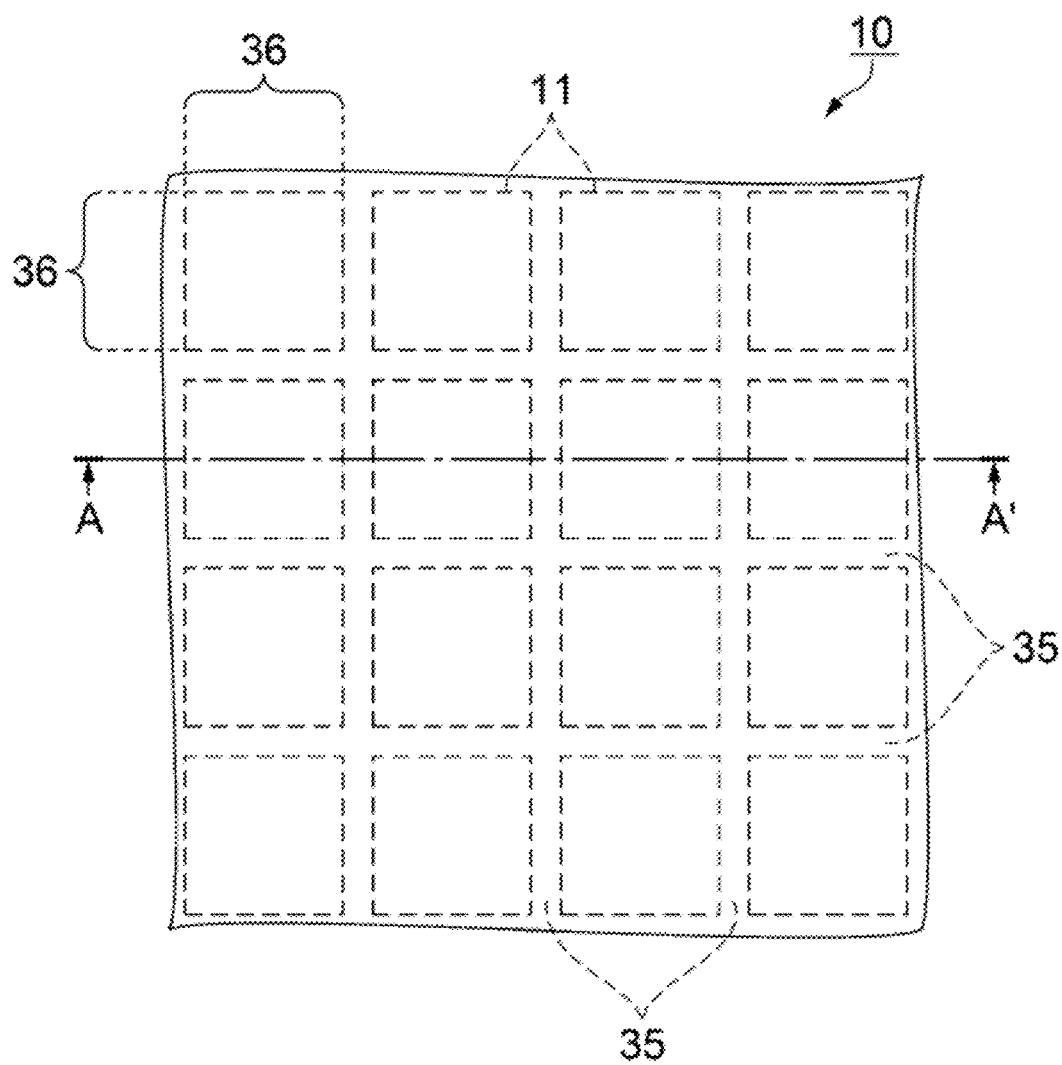
FIG. 3 is a schematic plan view showing a first embodiment of the structure of the electrophoretic display device according to the invention.
Figure 4:
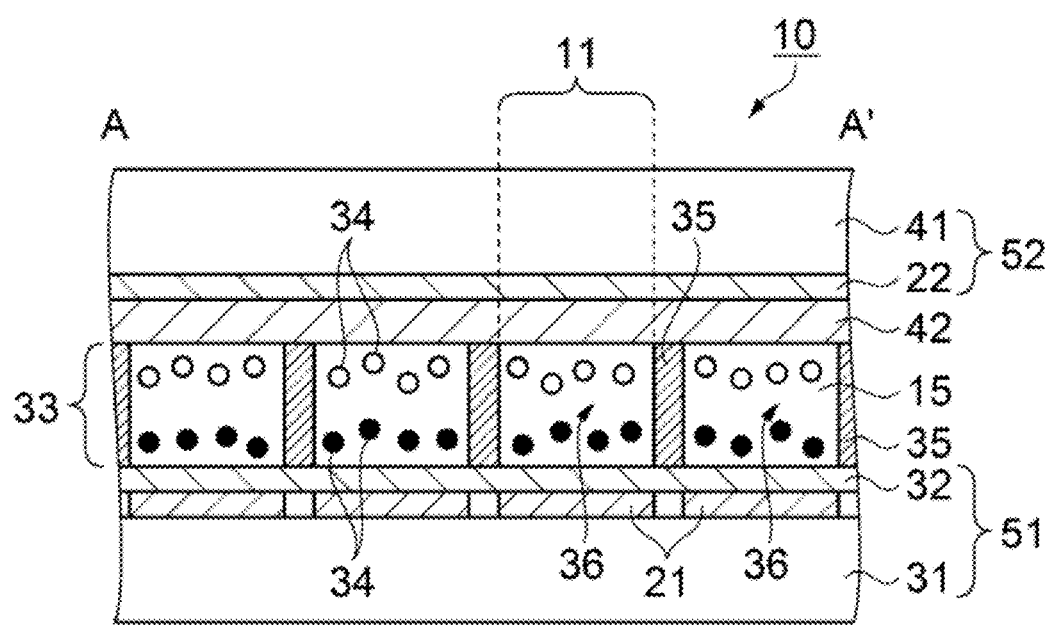
FIG. 4 is a line A-A' cross-sectional view of the electrophoretic display device shown in FIG. 3.
Figure 5:
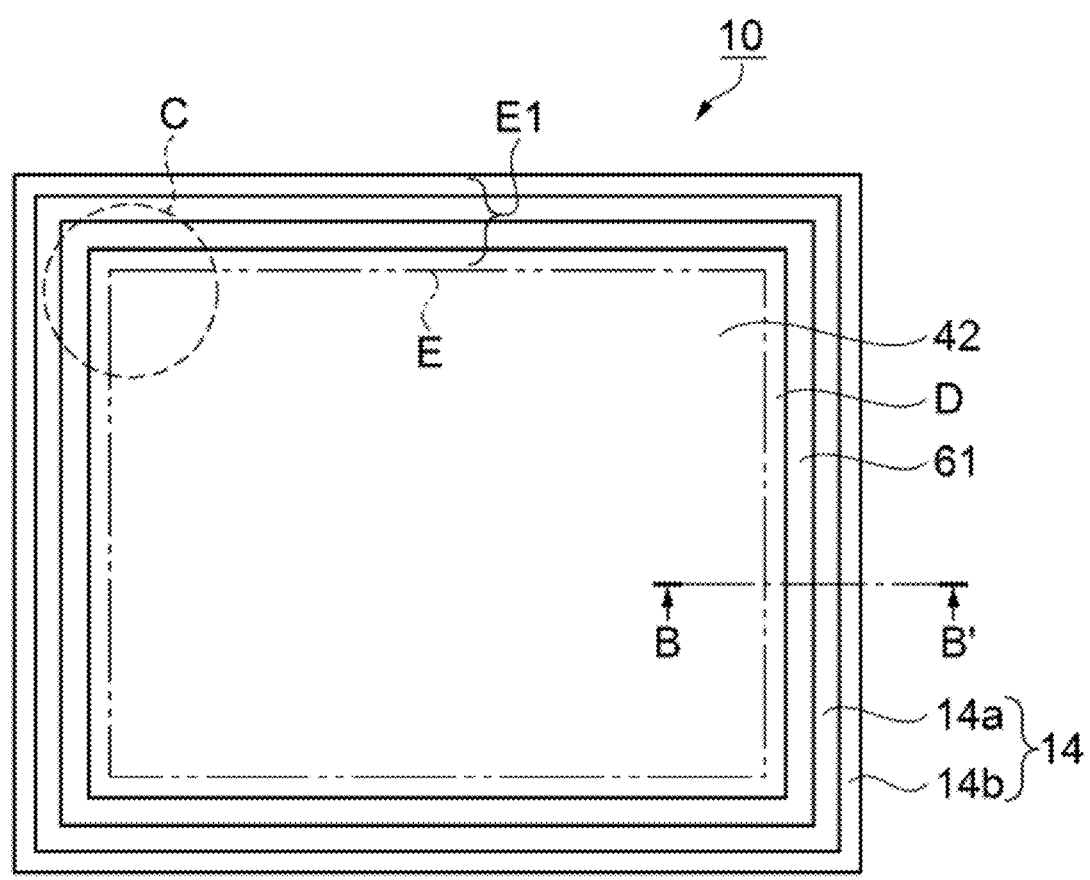
FIG. 5 is a schematic plan view of the structure of a display region and the peripheral seal part of the electrophoretic display device shown in FIG. 3.
Figure 6:
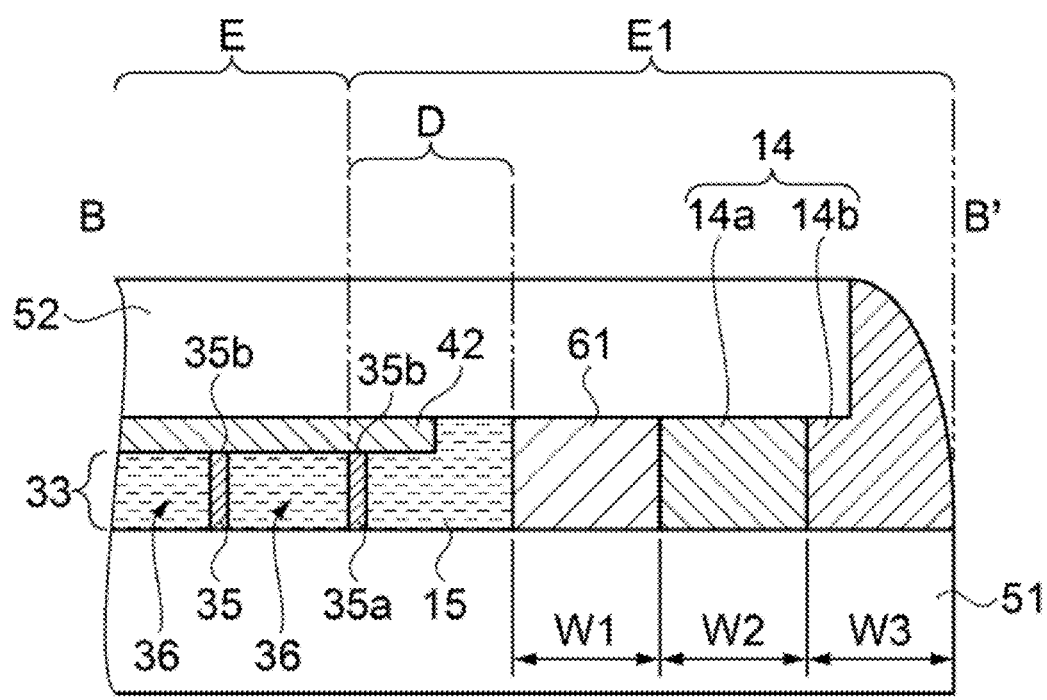
FIG. 6 is a line B-B' cross-sectional view of the electrophoretic display device shown in FIG. 5.
Figure 7:
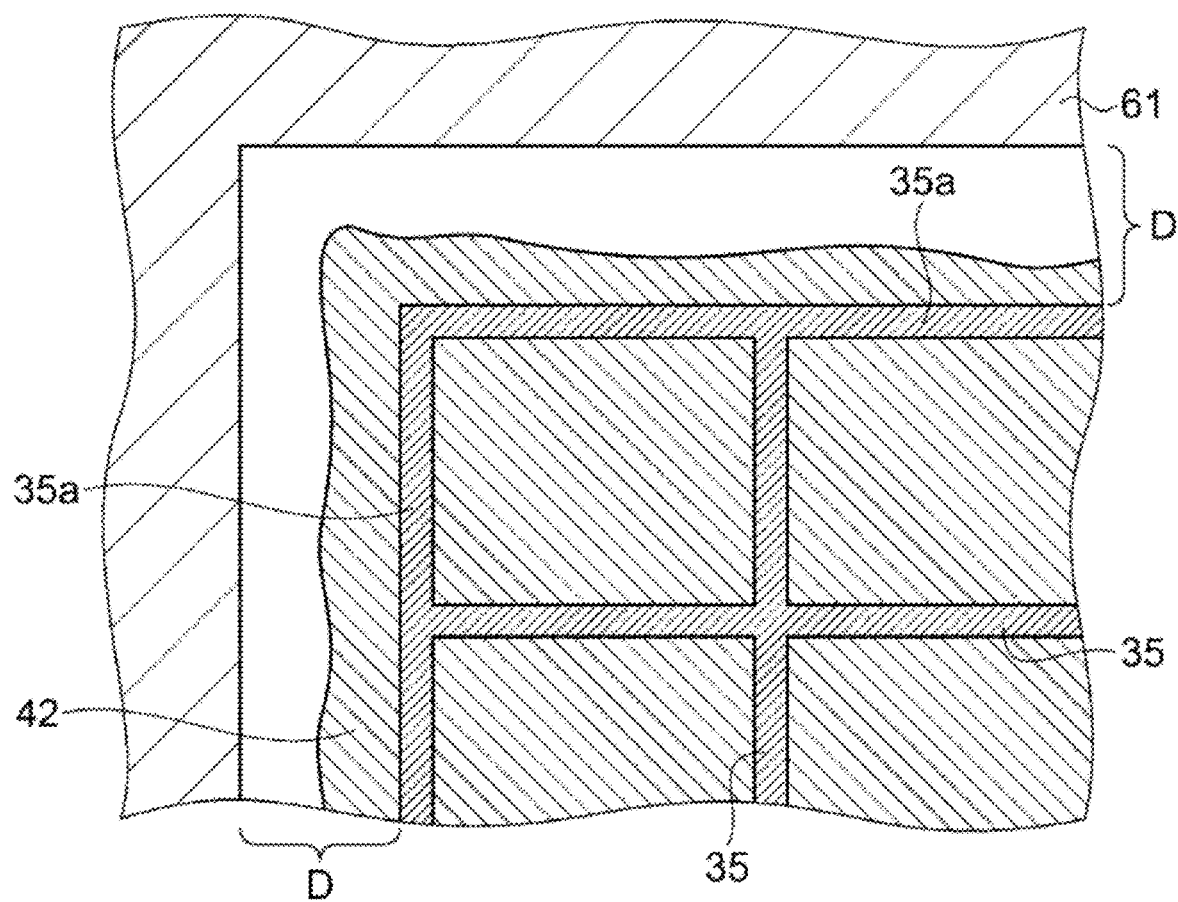
FIG. 7 is an enlarged plan view showing an enlarged C part of the electrophoretic display device shown in FIG. 5.

FIG. 2 is an equivalent circuit diagram showing a first embodiment of the electrical configuration of the electrophoretic display device according to the invention, FIG. 3 is a schematic plan view showing a first embodiment of the structure of the electrophoretic display device according to the invention, FIG. 4 is a line A-A' cross-sectional view of the electrophoretic display device according to the invention shown in FIG. 3, FIG. 5 is a schematic plan view of the structure of a display region and the peripheral seal part of the electrophoretic display device shown in FIG. 3, FIG. 6 is a line B-B' cross-sectional view of the electrophoretic display apparatus shown in FIG. 5, FIG. 7 is an enlarged plan view showing an enlarged C part of the electrophoretic display device shown in FIG. 5. Also, in FIGS. 5 to 7, an insulating layer, wiring, and the illustrated electrode and the like will be omitted.

As shown in FIG. 2, the electrophoretic display device 10 includes a plurality of data lines 12, and a plurality of scanning lines 13, the pixel 11 is arranged in a portion where the data lines 12 and scanning lines 13 intersect. Specifically, the electrophoretic display device 10 includes a plurality of pixels 11 arranged in a matrix along the data lines 12 and scanning lines 13. Each pixel 11 has electrophoretic dispersion liquid containing electrophoretic particles 34 and a dispersion medium 15 disposed between a pixel electrode 21 and a common electrode 22. The pixel electrode 21 is connected to the data line 12 via a TFT (transistor) 16. Further, the gate electrode of the TFT 16 is connected to the scanning line 13. Also, FIG. 2 is exemplary, if necessary, other elements such as a storage capacitor may be incorporated.

Further, as shown in FIGS. 3 and 4, the electrophoretic display device 10 includes an element substrate 51 as a first substrate, a counter substrate 52 as a second substrate provided to face the element substrate 51, and an electrophoretic layer 33.

The element substrate 51 is provided with, for example, a pixel electrode 21 corresponding to each pixel 11 disposed on a first base member 31 which is made of a translucent glass substrate.

More specifically, as shown in FIGS. 3 and 4, the pixels 11 (pixel electrode 21) is formed, for example, a matrix in a plan view. Materials of the pixel electrode 21 are used for example light transmitting materials such as ITO (tin added indium oxide: Indium Tin Oxide) or the like.

The circuit section (not shown) is provided between the first base member 31 and the pixel electrode 21, includes TFT 16 and the like. TFT 16 are electrically connected to each pixel electrode 21 via a contact portion (not shown). Although not shown, various wiring lines (for example, data lines 12 or scanning lines 13, etc.) and elements (for example capacitors) and the like are disposed along with TFT 16 in the circuit portion. Further, an insulating layer 32 is formed on the entire surface of the first base member 31 including the upper pixel electrode 21.

The element substrate 51 is configured by the first base member 31, the pixel electrode 21, the insulating layer 32 and a circuit unit.

A common electrode 22 is formed on a second base member 41, which is included in the counter substrate 52 and made of a glass substrate (electropholetic layer 33 side in FIG. 4). The common electrode 22 is provided commonly corresponding to the plurality of pixels 11 having translucency. The common electrode 22 is used for example light-transmitting material such as ITO. The counter substrate 52 includes these second base member 41 and the common electrode 22.

Further, a molecule X is provided between the element substrate 51 and the counter substrate 52, and specifically, the molecule X is coated on the common electrode 22, and thus a molecule X coating layer 42 is formed. The molecule X coating layer 42 by the molecule X will be described in detail below.

The electrophoretic layer 33 is provided between the insulating layer 32 and the molecule X coating layer 42. The electrophoretic layer 33 is composed of an electrophoretic dispersion liquid which contains at least one or more electrophoretic particles 34 and a dispersion medium 15 in which the electrophoretic particles 34 are dispersed. The electrophoretic dispersion liquid (dispersion medium 15 and electrophoretic particles 34) is used to fill a (divided) space (region) which is defined by an insulating layer 32, the molecule X coating layer 42, and the partition 35 provided on the first base member 31.

As shown in FIG. 3, partitions 35 are formed in a grid pattern. The partition 35 is preferably formed of a transparent material (such as acrylic or epoxy resin). The width of the partition 35 is for example 5 μm.

In the embodiment, a structure where the pixel electrode 21 is disposed in each pixel 11 and the partition 35 is disposed in each pixel electrode 21 has been described. This is not limiting and the partitions may be formed in each of a plurality of pixels (for example, for every 2 to 20 pixels).

Also, hereafter, a region surrounded by the partition 35, the insulating layer 32 and the molecule X coating layer 42 referred to as cell 36. Also, a charged electrophoretic layer 33 is included in one cell 36.

Further, the height of the partition 35 is set to be approximately equal to the thickness of the electrophoretic layer 33 is defined by the partition 35, for example, preferably not less than 10 μm and not more than 150 μm, more preferably not less than 20 μm and not more than 100 μm, particularly preferably about 30 μm. Thereby, it is possible to display with excellent contrast and white display and black display by movement of the electrophoretic particles 34. The electrophoretic particles 34 will be described in detail below.

Further, in the present embodiment, a dispersion medium 15 is used a silicone oil being movable the electrophoretic particles 34 at a temperature of about −30° C. The viscosity of the silicone oil is for example not more than 10 cP. The silicone oil is a low viscosity solvent, and thus the electrophoretic particles 34 can migrate between the electrodes at a speed of not more than 500 ms for example even at a low temperature of about −30° C.

As the dispersion medium 15, besides silicone oils, for example alcohols such as butanol and glycerin, cellosolves such as butyl cellosolve, esters such as butyl acetate, ketones such as dibutyl ketone, pentane and aliphatic hydrocarbons s (liquid paraffin), and a nitrile such as acetonitrile can be used.

Further, as shown in FIGS. 5 and 6, the electrophoretic display device 10 includes a display region E, and a frame region E1 surrounding the display region E. The frame region E1 includes a dummy pixel region D which is a region that does not contribute to the display of the electrophoretic layer 33, a frame partition 61 disposed outside the dummy pixel region D, and a seal portion 14 which is located outside the frame partition 61.

Also, the width of the frame region E1 is for example about 1 mm. The width of the dummy pixel region D is for example 80 µm. Partition 35a, which is formed in the same shape as partition 35 disposed in the display region E, is disposed in the display region E side of the dummy pixel region D. The width of partitions 35, 35a (the width of top portion 35b) is about not less than 3 µm and not more than 10 µm, and is 5 µm in the embodiment. The distance between the adjacent partition 35 and partition 35, 35a is for example 150 µm.

On the outside of the dummy pixel region D, the frame partition 61 is provided. The frame partition 61 can block the dispersion medium 15 so as not flowing outward, and are used for adjusting the cell gap and are arranged so as to surround the dummy pixel region D. Also, the frame partition 61 is usually made of the same material as the partition 35 of the display region E.

The width W1 of the frame partition 61 is for example 100 µm. The height of the frame partition 61 is for example in the range of 10 µm to 50 µm, which is 33 µm in the embodiment.

Also, the frame partition 61 is also used to ensure that the first seal member 14a disposed adjacent does not protrude in the display region E.

In this embodiment, as shown in FIG. 6, the sealing portion 14 has a first sealing material 14a and a second sealing material 14b. The first seal member 14a is used to adhere when bonding the element substrate 51 and the counter substrate 52 and are provided so as to surround the frame partition 61.

The width W2 of the first sealing material 14a is for example 400 µm. The viscosity of the first sealing material 14a is for example not less than 300,000 Pa·s and not more than 1 million Pa·s, is preferably about 400,000 Pa·s. The use of the first sealing material 14a having such viscosity can be kept increasing the contact area between the element substrate 51 and the counter substrate 52 in case of the bonding of the element substrate 51 and the counter substrate 52.

Further, the second seal member 14b is used to seal between the element substrate 51 and the counter substrate 52 and is disposed so as to surround the first seal material 14a.

The width W3 of the second sealing member 14b is for example 400 µm. The viscosity of the second sealing member 14b is for example not less than 100 Pa·s and not more than 500 Pa·s, preferably about 400 Pa·s. The use of the second sealing member 14b having such viscosity allows the second seal member 14b to enter between the element substrate 51 and the counter substrate 52 around the first seal member 14a. Therefore, an adhesive strength of the second sealing member 14b can be improved. Further, the invading of the moisture to the inside through the second sealing member 14b and the first seal member 14a from the outside can be suppressed, and thus a reliable sealing structure is obtained.

Also, the sealing portion 14 is besides the case of providing as separate bodies as the case of a first sealing material 14a and the second sealing member 14b may be composed of a single second sealing member 14b with omitting the first sealing material 14a according to the constituent material of the second sealing member 14b.

Next, the molecule X coating layer 42 of this embodiment will be described.

As shown in FIG. 6, the molecule X coating layer 42 is provided between a top portion 35b of a partition 35 and the counter substrate 52 in a display region E.

By doing so, a space (cell) partitioned by the molecule X coating layer 42 and the element substrate 51 (specifically, insulating layer 32), and the partition 35 is formed, and this space (closed space) is filled with an electrophoretic dispersion liquid including a dispersion medium 15 and electrophoretic particles 34, such that the dispersion medium 15 and the electrophoretic particles 34 cannot be moved between adjacent cells 36.

The molecule X coating layer 42 may be formed by depositing a transparent resin material including the molecule X on the counter substrate 52 or may be formed by being modified to a resin layer formed on the counter substrate 52.

As the constituent material of the molecule X coating layer 42, a substrate including an aromatic ring of the molecule X and having transparency is preferable, and examples thereof may include polyester-based resins such as polyethylene terephthalate and polyethylene naphthalate, a polycarbonate-based resin, a polyvinyl chloride-based resin, a polystyrene-based resin, a polyarylate-based resin, a polysulfone resin, a polybenzimidazole resin, a polyphenylene sulfide-based resin, a polyimide resin, an aramid resin, and the like, and one or a combination of at least two thereof can be used. Among those, the polyester-based resins and the polyarylate-based resins are particularly preferable, and a thickness of the substrate is preferably from 5 to 100 nm.

It is to be noted that the aromatic ring of the molecule X includes any one of benzene, toluene, xylene, mesitylene, pyridine, pyrrole, thiophene, acetophenone, aniline, anisole, benzaldehyde, benzyl alcohol, benzylamine, fluorobenzene, bromobenzene, dibromobenzene, chlorobenzene, dichlorobenzene, phenol, furfural, bromoaniline, nitrobenzene, nitrotoluene, toluidine, naphthalene, anthracene, naphthacene, pentacene, benzopyrene, chrysene, pyrene, triphenylene, corannulene, coronene, and ovalene.

Further, after a polyvinyl alcohol (PVA) resin is applied and formed on the counter substrate 52, the molecule X can be modified by esterifying a hydroxyl group (OH group) existing on a surface formed of PVA with an acid halide. As the acid halide, for example, a thiophene-2-acetyl chloride, a phenylacetyl chloride, a 2-(2-naphthyl) acetyl chloride, a p-tolylacetyl chloride, a fluorophenylacetyl chloride, a bromophenylacetyl chloride, or a 4-chlorophenylacetyl chloride is used to esterify the PVA, such that the molecule X coating layer 42 can be formed. Among those, the thiophene-2-acetyl chloride or the phenylacetyl chloride is particularly preferable, and the acid halide can include a thiophene or phenyl group which has one molecule X. The acid halide can be applied by a spin coating method, which is preferable to be performed in an inert atmosphere (for example, N2 atmosphere). By doing so, it is suppressed that water contained in the atmosphere reacts with Cl molecules included in the phenylacetyl chloride.

As a result, the molecule X provided in the molecule X coating layer 42 has the aromatic ring having the cyclic structure, and in these cyclic structures, electrons are delocalized. As a result, the bias (polarization) of the electron density tends to occur, so that the attractive force with the positively or negatively charged electrophoretic particles 34 becomes stronger.

However, since the attractive force works slightly stronger than an intermolecular force, the force which can move the electrophoretic particles when a display image is rewritten by the application of voltage is weak. Therefore, since the fixation (adsorption) of the electrophoretic particles 34 can be suppressed and the retention property of the electrophoretic particles 34 after the application of voltage can be kept, it is possible to provide the electrophoretic display device 10 having excellent display characteristics.

Here, when a refractive index of the molecule X is less than 1.5, since polarizability of the molecule X is decreased, the attractive force with the charged electrophoretic particles 34 is decreased and the electrophoretic particles 34 are dispersed over time without being retained. In addition, when the refractive index of the molecule X is more than 3.0, the transmittance is decreased or a color tone is manifested, so that the reflectance of the electrophoretic display device 10 is decreased. Therefore, by setting the refractive index of the molecule X to from 1.5 to 3.0, the molecules are more likely to be polarized and the polarizability can be increased. The attractive force of molecules having high polarizability with the positively or negatively charged electrophoretic particles 34 becomes strong, such that the fixation (adsorption) of the electrophoretic particles 34 can be suppressed and the retention property of the electrophoretic particles 34 after application of voltage can be retained.

When the abundance of the molecule X is less than 1 molecule/10 nm2, the effect of the attractive force with the electrophoretic particle 34 by the high polarizability of the molecule X becomes small, so that the retention property is not manifested. Also, when the abundance of the molecule X exceeds 10 molecules/10 nm2, since the molecule X exists densely, the attractive force with the electrophoretic particle 34 becomes strong. Therefore, although the retention property is increased, the responsiveness of the electrophoretic particles 34 is decreased at the time of rewriting the display image. From the above, it was found that by adjusting the abundance of the molecule X to a ratio of from 1 molecule/10 nm2 to 10 molecules/10 nm2, the fixation (adsorption) of the electrophoretic particles 34 can be suppressed and the retention property of the electrophoretic particles 34 can be retained.

Further, the abundance of the molecule X can be confirmed by using TOF-SIMS or FT-IR.

Figure 8:
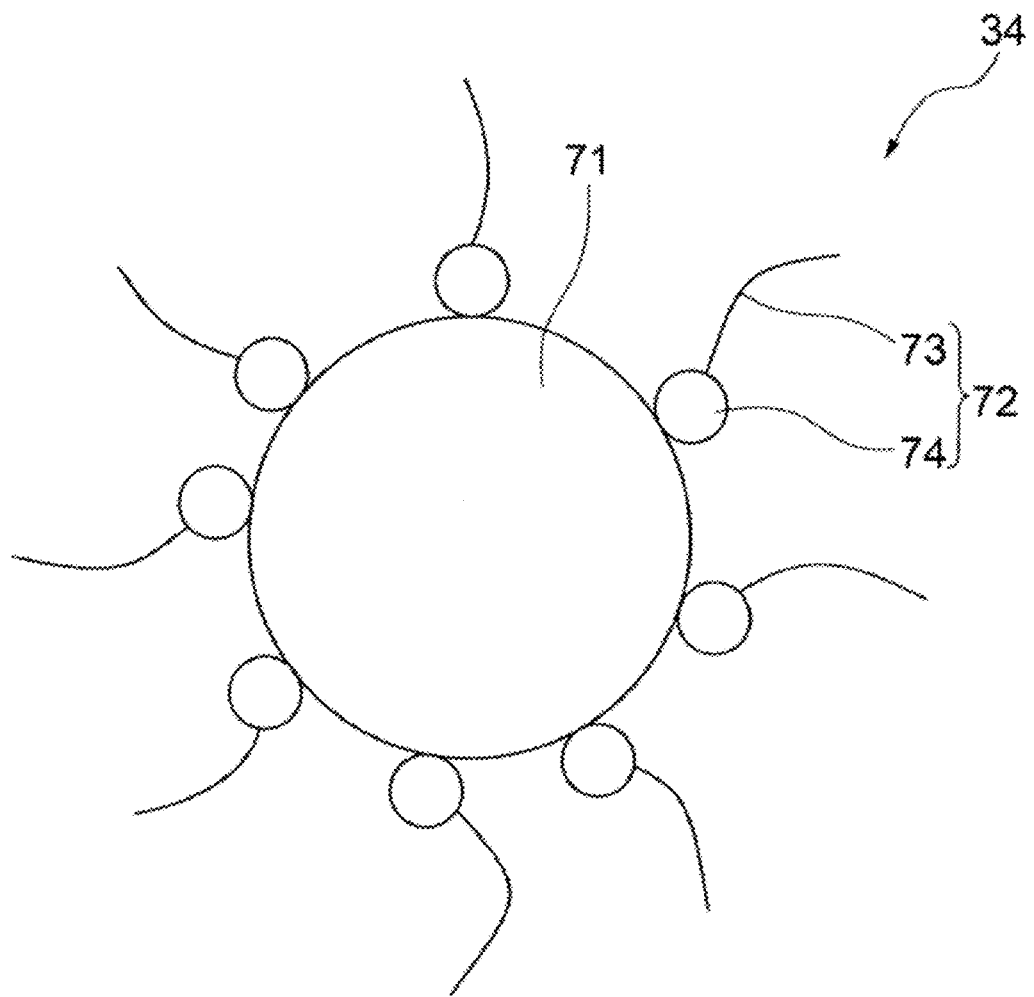
FIG. 8 is a schematic view of an electrophoretic particle according to the present embodiment.

FIG. 8 is a schematic view showing the electrophoretic particles 34 of the present embodiment. As shown in FIG. 8, the electrophoretic particle 34 has a core particle 71 and a siloxane-based compound 72 bonded to a surface of the core particle.

Next, the electrophoretic particles 34 of the present embodiment will be described. In the present embodiment, as shown in FIG. 8, the core particle 71 is a charged particle including, for example, a white or black particle. The white particle is a particle including white pigment such as a titanium oxide, a zinc oxide, or an antimony trioxide, and may be used by being negatively charged, for example. The black particle is a particle including black pigment such as carbon black, aniline black, titanium black, or copper chromite, and is used by being positively charged, for example.

Further, instead of the white particle and the black particle, a color particle having red, green, blue pigment or the like as a forming material may be used. According to this configuration, it is possible to provide the electrophoretic display device 10 capable of performing a color display by displaying red, green, blue, and the like.

The electrophoretic particle 34 is inhibited from being very close to electrophoretic particle 34 by the siloxane-based compound 72 bonded to the surface of the core particle 71, so that the electrophoretic particles are appropriately dispersed in the dispersion medium 15. In addition, since the siloxane-based compound 72 has high affinity for the non-polarity or low-polarity dispersion medium 15, the dispersibility of the electrophoretic particles 34 in the dispersion medium 15 can be increased. In addition, since the siloxane-based compound 72 increases the dispersibility of the electrophoretic particles 34 in the dispersion medium 15, an area of the surface of the core particle 71 covered with the siloxane-based compound 72 can be reduced. In other words, an area of a region in which the siloxane-based compound 72 does not bond on the surface of the core particle 71 can be increased. Therefore, it is possible to increase the chargeability of the electrophoretic particles 34 by sufficiently exhibiting chargeability of the core particle 71 itself in the region or introducing a group having chargeability into the region.

As shown in FIG. 8, the siloxane-based compound 72 has a polymerization portion 73 including the molecule X and a siloxane bonding portion 74. The siloxane-based compound 72 can be obtained by polymerizing a bonding portion having a silane coupling portion with a monomer having the polymerization portion 73 including a molecule X. As an organic material of the siloxane bonding portion 74, for example, 3-methacryloxypropylmethyldiethoxysilane, 3-methacryloxypropylmethyldimethoxysilane, p-styryltrimethoxysilane, N-phenyl-3-aminopropyltrimethoxysilane, 3-methacryloxypropyltriethoxysilane, and the like can be used. Among them, the 3-methacryloxypropylmethyldiethoxysilane is preferable.

As the monomer having the polymerization portion 73, styrene, chlorostyrene, methylstyrene, t-butylstyrene, fluorostyrene can be used, and among them, the styrene is preferable.

In addition, since the siloxane-based compound 72 may not be polymerized as long as the siloxane-based compound 72 has the silane coupling portion and the molecule X, and p-styryltrimethoxysilane or N-phenyl-3-aminopropyltrimethoxysilane can be directly bonded to the core particle 71 without a polymerization reaction since the molecule X is included in a molecule, the electrophoretic particle 34 having the molecule X can be obtained.

The obtained siloxane-based compound 72 is subjected to a dehydration condensation reaction between a hydrolyzable group derived from a coupling agent and a hydroxyl group on the surface of the core particle 71, such that the electrophoretic particles 34 can be obtained.

A weight average molecular weight of the siloxane-based compound 72 is preferably about from 100 to 100,000, and more preferably about from 10,000 to 60,000. By setting the weight average molecular weight within the above range, a length of a molecular structure of the siloxane-based compound 72 is optimized, and the region in which the chargeability of the core particle 71 itself is exhibited and a polarization group is introduced can be sufficiently secured on the surface of the core particle 71, and the electrophoretic particles 34 to which dispersibility derived from a long-chain linear chain structure is sufficiently imparted can be obtained.

The weight average molecular weight of the siloxane-based compound 72 is a weight average molecular weight in terms of polystyrene which is measured using gel permeation chromatography (GPC).

Accordingly, since a π-π interaction works by the molecule X included in the electrophoretic particles 34 and the molecule X provided in a second substrate to apply the stronger attractive force than the intermolecular force, it is possible to suppress the fixation (adsorption) of the electrophoretic particles 34 and keep the retention property of the electrophoretic particles 34 after the application of voltage. In addition, since the π-π interaction works between the electrophoretic particles 34 by the molecule X included in the electrophoretic particles 34, the electrophoretic particles 34 can exist densely, such that it is possible to provide the electrophoretic display device 10 having high-contrast display characteristics.

When a weight fraction of the molecule X is less than 20%, the effect of the attractive force with the electrophoretic particle 34 by the high polarizability of the molecule X becomes small, so that the retention property is not manifested. In addition, when the weight fraction of the molecule X exceeds 95%, since the molecule X exists densely, the attractive force with the electrophoretic particle 34 becomes strong. Therefore, although the retention property is increased, the responsiveness of the electrophoretic particles 34 is decreased at the time of rewriting the display image. Accordingly, since by setting the weight fraction of the molecule X to be from 20% to 80%, the fixation (adsorption) of the electrophoretic particles 34 can be suppressed and the retention property of the electrophoretic particles 34 after the application of voltage can be kept, it is possible to provide the electrophoretic display device 10 having the excellent display characteristics.

Then, a manufacturing method for producing the electrophoretic display device 10 described above will be described.

Figure 9:
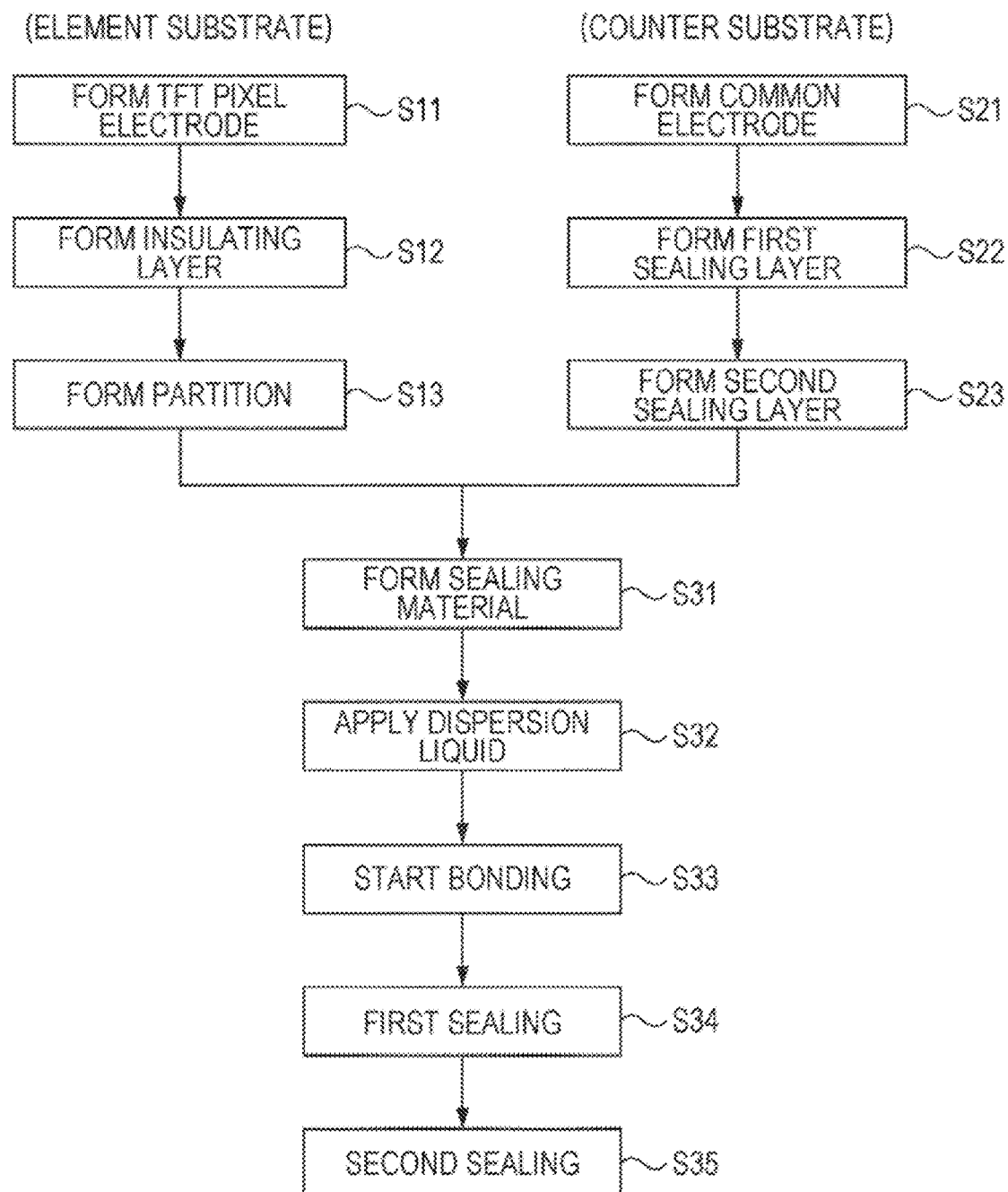
FIG. 9 is a flowchart showing the order of steps the method for producing the electrophoretic display device.

FIG. 9 is a flowchart showing a method of manufacturing an electrophoretic display device in the order of steps. FIGS. 10 to 17 are schematic sectional views for explaining a manufacturing method of the electrophoretic display device shown in FIG. 3. Hereinafter, a method of producing an electrophoretic display device will be described with reference to FIGS. 9 to 17.

First, the manufacturing method of the element substrate 51 will be described with reference to FIG. 9.

First, TFT 16 or a pixel electrode 21, made of a light transmissive material such as ITO, and the like are formed on a first base member 31 made of a transparent material such as glass (step S11). Specifically, the TFT 16 and the pixel electrode 21 and the like on the first base member 31 are formed by using a known film forming, photolithography technique and etching technique. Also, in the description using a cross-sectional view of a subsequent, description and illustration of such as TFT 16 or the pixel electrode 21 are omitted.

Then, an insulating layer 32 is formed on the first base member 31 (step S12).

A method for forming the insulating layer 32 is not particularly limited, for example, an insulating resin material is formed a film on the first base member 31 by using a coating method such as spin coating method so that an insulating layer 32 is formed.

Figure 10:
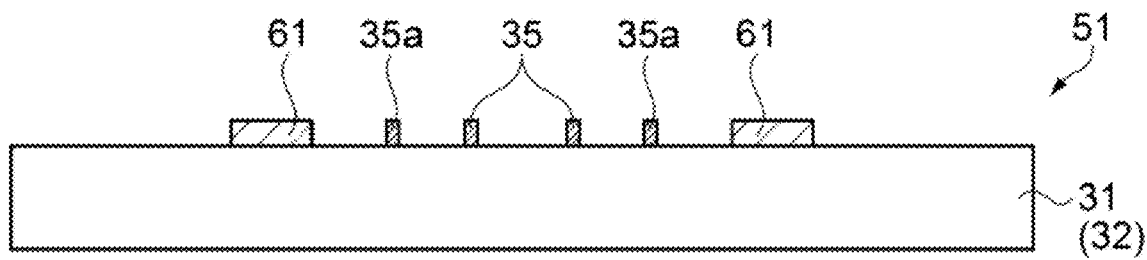
FIG. 10 is a schematic cross-sectional view for explaining a method for producing an electrophoretic display device shown in FIG. 3.

Then, as shown in FIG. 10, the partition 35 is formed on first base member 31 (specifically, the insulating layer 32) (step S13). More specifically, the partition 35 of the display region E, and the partition 35a of the outermost periphery of the display region E, a frame partition 61 provided on the outside thereof, formed at the same time.

Partitions 35, 35a, and the frame partition 61 for example can be formed by using a known film forming technique, a photolithography technique and an etching technique.

Thus, the partitions 35, 35a, and the frame partition 61 are simultaneously formed by the same material, thereby being able to be efficiently produced. Thus, the element substrate 51 is completed.

Also, the partition 35 is made of a material which is insoluble in the dispersion medium 15, regardless of it does not matter whether the material is organic substances or inorganic substances. Specifically, examples of organic material include urethane resin, urea resin, acrylic resin, polyester resin, silicone resin, acryl silicone resin, epoxy resin, polystyrene resin, styrene acrylic resin, polyolefin resin, butyral resin, vinylidene chloride resin, melamine resin, phenol resins, fluorine resins, polycarbonate resins, polysulfone resins, polyether resins, polyamide resins, polyimide resins and the like. These resin alone or two or more types of complex agents is used.

Next, a method for producing the counter substrate 52 will be described.

First of all, a common electrode 22 is formed on the second base member 41 (step S21). More specifically, the common electrode 22 is formed on the entire surface of the second base member 41 made of a translucent material such as a glass substrate by using a known film formation technique. Also, explanations and illustration of the common electrode 22 will be omitted in the description below referring to the sectional view.

Figure 11:
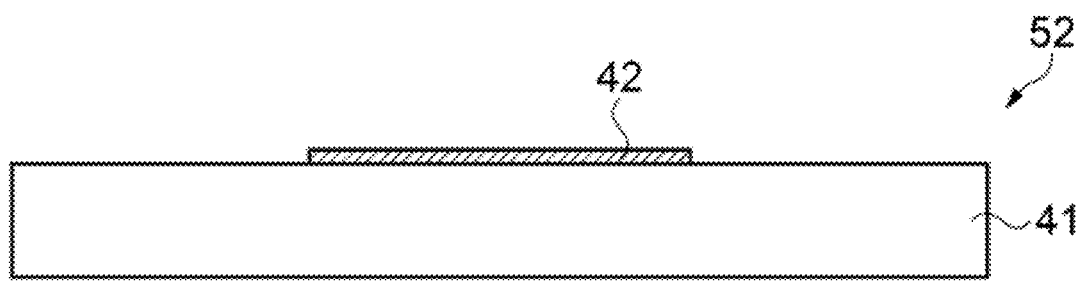
FIG. 11 is a schematic cross-sectional view for explaining a method for producing an electrophoretic display device shown in FIG. 3.

Then, a molecule X coating layer 42 is formed on the common electrode 22 (step S22). Regarding a method of forming the a molecule X coating layer 42, as shown in FIG. 11, for example, a resin material is formed a film by using a coating method such as spin coating on the second base member 41 so that a molecule X coating layer 42 is formed.

Further, a patterning to correspond to the shape of the molecule X coating layer 42 to be formed by using an etching method obtains a molecule X coating layer 42. Also, the method is not limited to a coating method, and may be formed by using a printing method. Thus, the counter substrate 52 is completed.

Then, a method of bonding the element substrate 51 and the counter substrate 52 will be described with reference to FIGS. 12 to 17.

Figure 12:
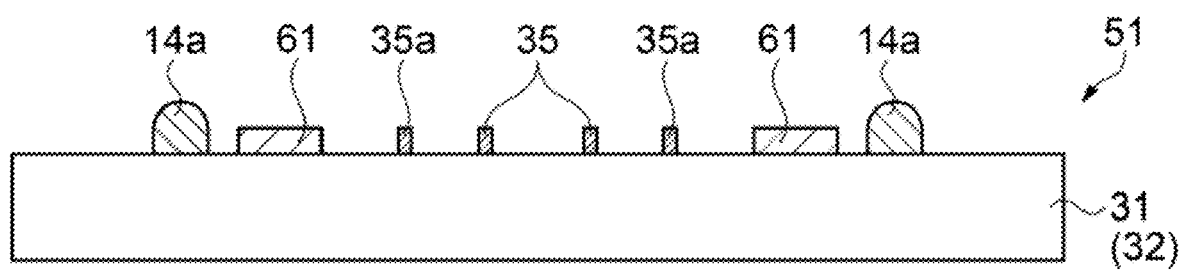
FIG. 12 is a schematic cross-sectional view for explaining a method for producing an electrophoretic display device shown in FIG. 3.

First, as shown in FIG. 12, a first sealing material 14a is coated on the outer periphery of the frame partition 61 in the atmosphere (step S31).

The material of the first sealing material 14a is for example KAYATORON (Nippon Kayaku, Ltd.) which is a relatively high viscosity liquid epoxy resin. The viscosity of the first sealing material 14a is for example not less than 300,000 Pa·s and not more than 1 million Pa·s, and is preferably 400,000 Pa·s. The width of the first sealing material 14a when applied is the width enough to withstand a vacuum which is for example 400 μm.

Figure 13:
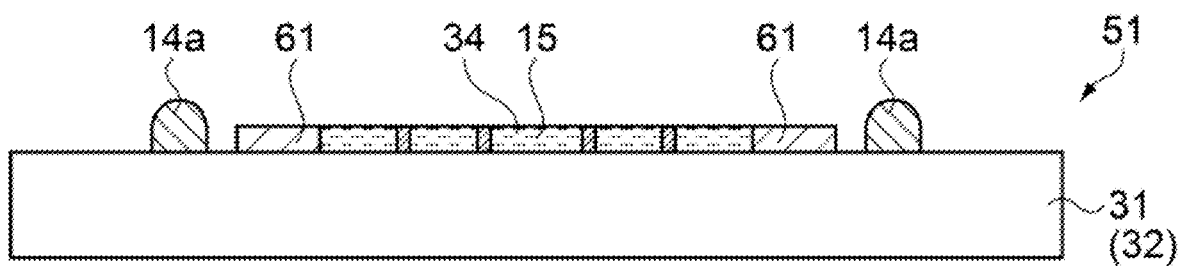
FIG. 13 is a schematic cross-sectional view for explaining a method for producing an electrophoretic display device shown in FIG. 3.

Then, as shown in FIG. 13, the electrophoretic dispersion liquid containing the electrophoretic particles 34 (white particles, black particles) and a dispersion medium 15 consisting of a silicone oil is applied in the display region E on the element substrate 51 (step S32). The coating method used for example the dispenser. Further, a die coater and the like can be applied. Also, the viscosity of the silicone oil is for example not more than 10 cP. The amount of the dispersion medium 15 is a liquid volume that satisfies the inside surrounded by the frame partition 61 when the element substrate 51 and the counter substrate 52 are bonded. In the embodiment, the height of the frame partition 61 is for example 33 μm.

Since the frame partition 61 is formed, it is possible to prevent a first sealing material 14a from entering (spreading) into a display region E side. Further, a width of the first sealing material 14a can be regulated so as not to be wider than a predetermined width. Thereby, it is possible to sufficiently secure the strength of the first sealing material 14a.

Figure 14:
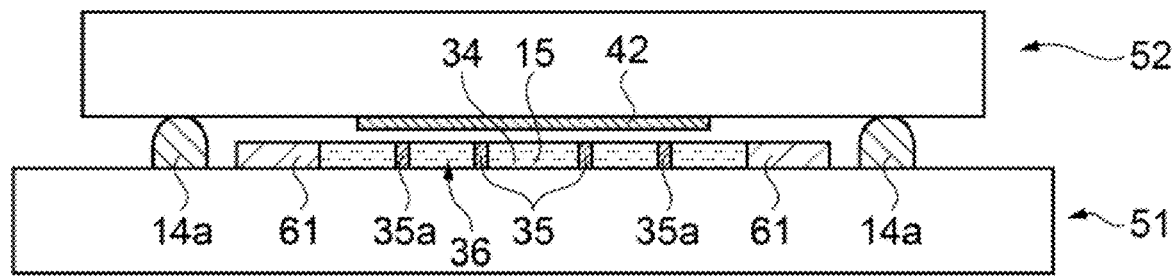
FIG. 14 is a schematic cross-sectional view for explaining a method for producing an electrophoretic display device shown in FIG. 3.

Then, as shown in FIG. 14, the bonding of the element substrate 51 and the counter substrate 52 is started (step S33).

Also, the bonding presses under vacuum negative pressure environment in order to prevent entering air bubbles into the cell 36. However, silicone oil has a high volatility property, so that the pressure is set to a low vacuum state lower than the atmospheric pressure. Specifically, this pressure is for example 500 Pa.

Figure 15:
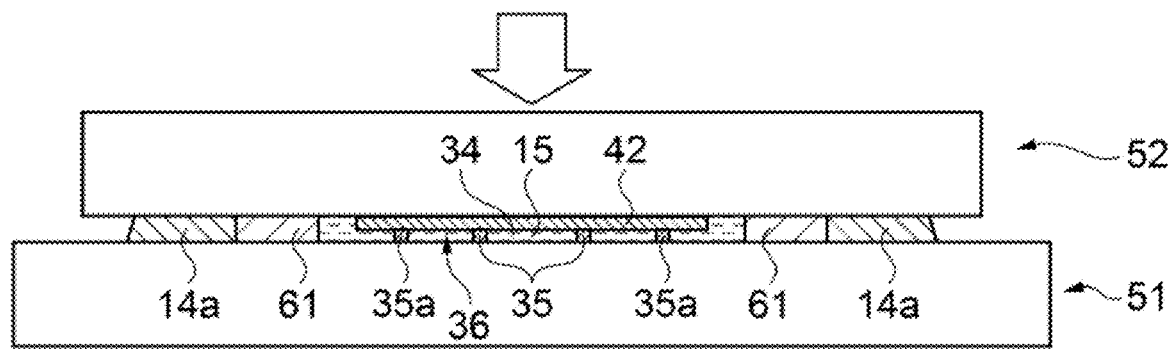
FIG. 15 is a schematic cross-sectional view for explaining a method for producing an electrophoretic display device shown in FIG. 3.

Then, as shown in FIG. 15, the electrophoretic dispersion liquid composed of the dispersion medium 15 and the electrophoretic particles 34 between the element substrate 51 and the counter substrate 52 is sealed (first seal; step S34).

That is, in a low vacuum state, the element substrate 51 and the counter substrate 52 are bonded through the first sealing material 14a.

The counter substrate 52 is pressed to the element substrate 51 so that the partition 35 is to be in contact with the molecule X coating layer 42.

As the counter substrate 52 is pressed to the element substrate 51, the first sealing material 14a is crushed, and the dispersion medium 15 is pushed into the frame partition 61 and used to fill the first sealing material 14a side. In this case, the partition 35 provided in the display region E, is covered with the molecule X coating layer 42 provided on the counter substrate 52 side, and thus the dispersion medium 15 is able to be prevented from moving between adjacent cells 36.

Figure 16:
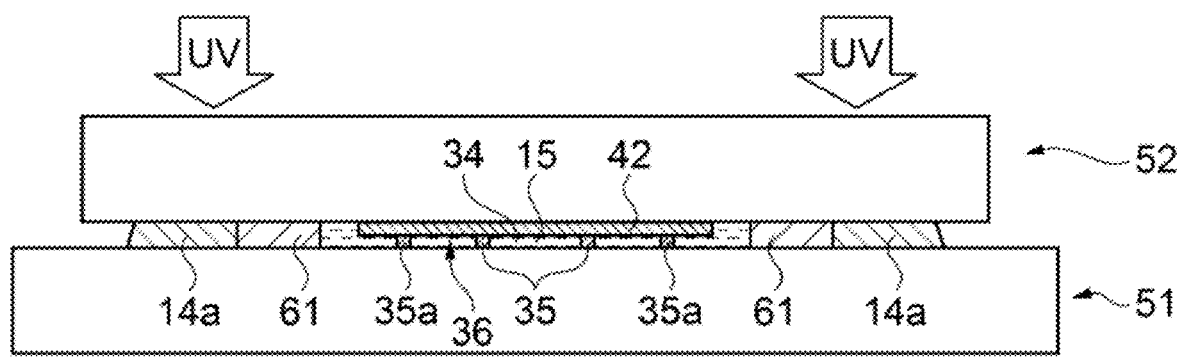
FIG. 16 is a schematic cross-sectional view for explaining a method for producing an electrophoretic display device shown in FIG. 3.

Thereafter, as shown in FIG. 16, the first sealing material 14a is irradiated an ultraviolet ray to be cured when the first sealing material 14a is an ultraviolet curable resin. Also, if the first sealing material 14a is the thermosetting resin, the first sealing material 14a is cured by heating.

A cell gap when the element substrate 51 and the counter substrate 52 are bonded is on the order of not less than 20 μm and not more than 50 μm, which is 33 μm in the embodiment. Further, the width of the first sealing material 14a which is crushed is for example not less than 200 μm and not more than 500 μm, and is 400 μm in the present embodiment.

Figure 17:
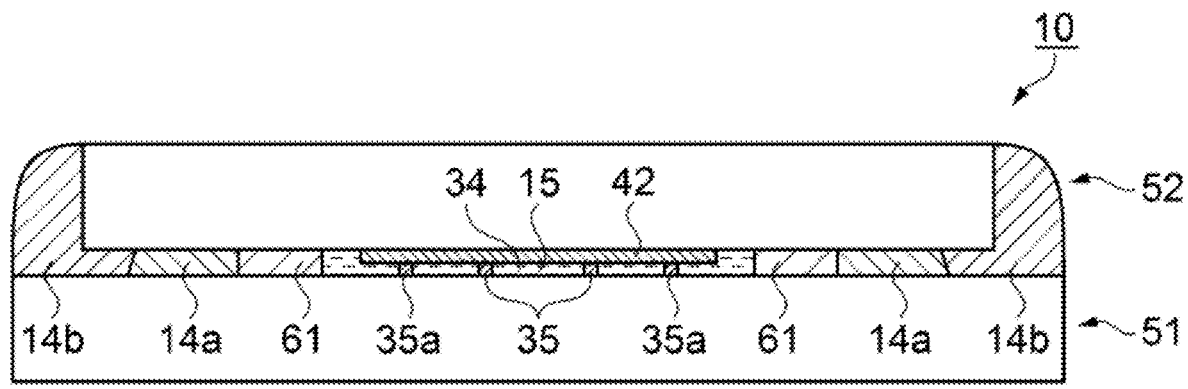
FIG. 17 is a schematic cross-sectional view for explaining a method for producing an electrophoretic display device shown in FIG. 3.

Then, as shown in FIG. 17, a second sealing material 14b is formed on the outer periphery of the first sealing material 14a to adhere in the air (the second seal; step S35).

Specifically, it is important that the second seal member 14b does not enter a moisture, is relatively low viscosity and enters the gap, and for example an acrylic or epoxy resin. Also, the viscosity of the second sealing member 14b is lower than the viscosity of the first sealing material 14a and for example not less than 100 Pa·s and not more than 500 Pa·s, and is preferably 400 Pa·s. A width of the second sealing member 14b is for example 400 μm.

As s method for applying the second sealing member 14b, for example, a dispenser or a die coater and the like is used. Thus, as shown in FIG. 17, a space sandwiched by the element substrate 51 and the counter substrate 52 are sealed. Thereafter, if necessary, the product is cut to the shape.

EXAMPLES

Next, specific Examples of the invention will be described.

First, a method of preparing a sample used in Examples and Comparative Examples is described. In the change in the abundance of the molecule X in the molecule X coating layer 42, after a polyvinyl alcohol resin is applied and formed on the counter substrate 52, a phenylacetyl chloride was applied, and the molecule X can be modified by esterifying a hydroxyl group (OH group) existing on a surface formed of PVA with an acid halide. At this time, the phenylacetyl chloride is diluted under N2 atmosphere to be a concentration of 20 mol %, such that the counter substrate 52 provided with the molecule X coating layer 42 of Examples 3 and 4 and Comparative Examples 1 and 2 can be prepared, and the phenylacetyl chloride is diluted under $N_2$ atmosphere to be a concentration of 90 mol %, such that the counter substrate 52 provided with the molecule X coating layer 42 of Examples 1 and 2 and Comparative Examples 3 and 4 can be prepared.

Next, a method of preparing a molecule X included in an electrophoretic particle 34 with different weight fractions will be described. In Example 1, the siloxane-based compound 72 of the electrophoretic particles 34 was synthesized as follows, 15 mol % of p-styryltrimethoxysilane as a coupling agent to 1-methoxy-2-propanol and 80 mol % of styrene and 10 mol % of methyl acrylate as a polymerization component were dissolved, a polymerization initiator (for example, dimethyl-2,2'-azobis(2-methylpropionate)) was dissolved in 1.5 mol % with respect to a total polymerization component, oxygen was removed by nitrogen bubbling, and polymerization was performed at 80° C. On the way, after 2 hours and 4 hours from the initiation of the polymerization, the polymerization initiator was added in a ratio of 1.5 mol % to the total polymerization component, and the polymerization was carried out for a total of 6 hours. After the polymerization, purification treatment and drying were carried out to obtain a siloxane-based compound 72. Then, the obtained siloxane-based compound 72 was added to a mixture including titanium black (black particles) and a liquid medium, heated, stirred, and washed to obtain the black particles provided with the molecule X of Example 1.

Next, in Examples 2 to 4 and Comparative Examples 3 and 4, the black particles in which the molecule X was provided in the same manner as in Example 1 except for the procedure in which the amount of styrene and methyl acrylate added was changed as follows were obtained.

Examples 2 and 3: 50 mol % of styrene and 40 mol % of methyl acrylate.

Example 4: 20 mol % of styrene and 60 mol % of methyl acrylate.

Comparative Example 3: 90 mol % of styrene and 0 mol % of methyl acrylate.

Comparative Example 4: 10 mol % of styrene and 70 mol % of methyl acrylate.

Next, by adding the black particles prepared as described above to the silicone oil as the dispersion medium 15, an electrophoretic dispersion liquid used in Examples and Comparative Examples was prepared. Then, the electrophoretic dispersion liquid is filled between the counter substrate 52 and the element substrate 51 opposed to the counter substrate 52, and the electrophoretic dispersion liquid is sealed between the counter substrate 52 and the element substrate 51 by the sealing materials 14a and 14b.

From the above, the samples used in Examples and Comparative Examples were prepared.

Table 1 shows the measurement results of the reflectance in a case in which a black display is made for each of the samples prepared above. The black display indicates the state in which the counter substrate 52 is used as the display surface and the electrophoretic particles 34 are moved to the substrate side. The reflectance is measured by measuring the reflectance (reflectance immediately after driving) immediately after stopping the application of voltage by applying a voltage between the counter substrate 52 and the element substrate 51 to display black, and is the result obtained by again measuring the reflectance (reflectance after 5 minutes of driving) after 5 minutes while the application of voltage is stopped. The decrease rate of the black reflectance after 5 minutes shows the difference between the reflectance immediately after driving and the reflectance after 5 minutes of driving. Here, if the change in reflectance is small, there is retention property, and if the change in reflectance is large, there is no retention property.

The evaluation criteria are as follows.

A: The decrease rate of the reflectance after 5 minutes is less than 1.5%.

B: The decrease rate of the reflectance after 5 minutes is from 1.5% to less than 2%.

C: The decrease rate of the reflectance after 5 minutes is 2% or more.

D: The decrease rate of the reflectance after 5 minutes is less than 1% but the response rate is decreased (the moving speed of the particles is decreased and the image rewriting time is long).

Comparative Example 5 is the conventional example, and as a result of experiments using a material that does not use the aromatic ring such as the molecule X, it was found that the reflectance after 5 minutes with respect to the reflectance immediately after the application of the driving voltage is 4.2% black floating. On the other hand, in Examples 1 and 2, since the proportion of the aromatic ring (molecule) included in the molecule X coating layer 42 is large or the molecule X included in the electrophoretic particles 34 is large, the π-π interaction having the aromatic ring is manifested, and as a result it was found that the reflectance is hardly decreased and the retention property is increased. In Examples 3 and 4, since the ratio of the aromatic ring (molecule) included in the molecule X coating layer 42 is decreased, but the weight fraction of the molecule X of the electrophoretic particles 34 is 20% or more, the retention property is retained and the decrease in reflectance after 5 minutes from immediately after the application of voltage was as low as 1.5% or less. In Comparative Examples 1, 2, and 4, as the performance result under the condition (the weight fraction of the molecule X was less than 20%) in which the molecule X is not added to the electrophoretic particles 34, since the dispersibility of the electrophoretic particles 34 was increased, the electrophoretic particles 34 is diffused when the application of voltage is stopped, such that it was found that the degree of retention property was decreased. In Comparative Example 3, in the case of using a material in which the weight fraction of the molecules X of the electrophoretic particles 34 is increased to 90%, the decrease in reflectance becomes small and the retention property becomes high, but since the agglomeration between the electrophoretic particles 34 occurs, it was found that the response is delayed at the time of rewriting the display image.

Then, a second embodiment of the electrophoretic display device 10 (the electrophoretic display device according to the invention) will be described.

Figure 18:
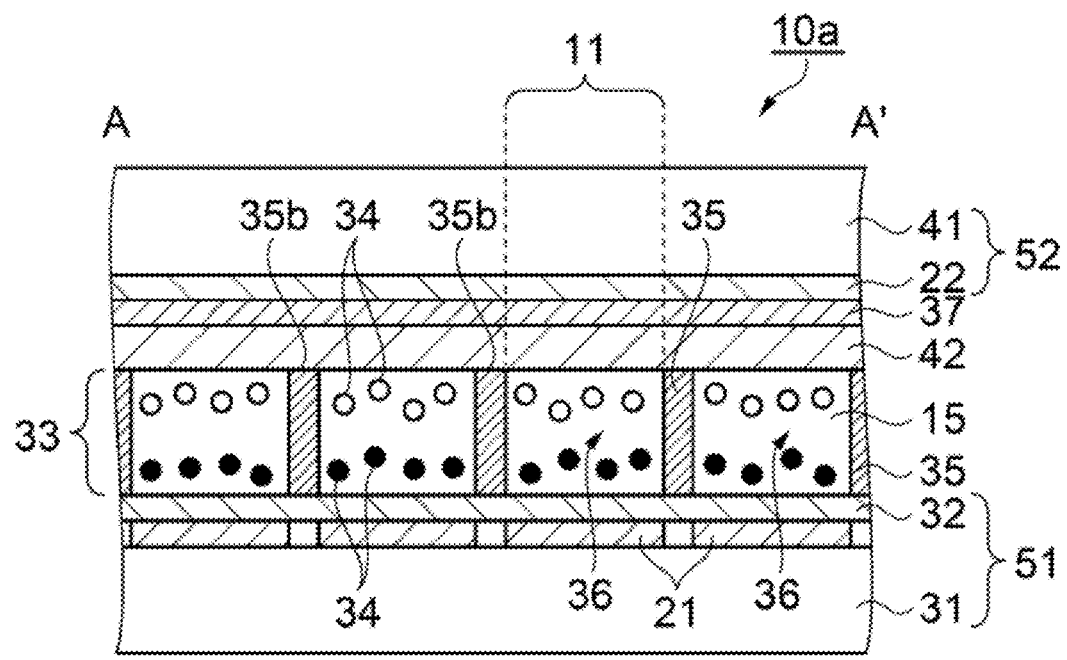
FIG. 18 is a schematic cross-sectional view showing a second embodiment of the structure of the electrophoretic display device according to the invention.

In the present embodiment, as shown in FIG. 18, a protective film 37 is provided between the counter substrate 52 and the molecule X coating layer 42. Examples of the material configuring the protective film 37 include rubber materials such as acrylonitrile • butadiene rubber (NBR), urethane rubber, isoprene rubber, butadiene rubber, chloroprene rubber, styrene-butadiene rubber, hydrin rubber, and nitrile rubber, and one or at least two thereof can be used in combination. Among those, the NBR is preferable. As a

TABLE 1

|  | Ratio of aromatic ring included in molecule X coating layer [number/10 nm$^2$] | Ratio of molecule X included in electrophoretic particle [%] | Reflectance immediately after driving [%] | Reflectance after 5 minutes of driving [%] | Decrease rate after 5 minutes of black reflectance | Evaluation |
|---|---|---|---|---|---|---|
| Example 1 | 10 | 80 | 4 | 4.5 | 0.5 | A |
| Example 2 | 10 | 50 | 4.1 | 5 | 0.9 | A |
| Example 3 | 1 | 50 | 4.3 | 5 | 0.7 | A |
| Example 4 | 1 | 20 | 4.4 | 5.6 | 1.2 | A |
| Comparative Example 1 | 10 | — | 4.1 | 5.8 | 1.7 | B |
| Comparative Example 2 | 1 | — | 4.2 | 6.1 | 1.9 | B |
| Comparative Example 3 | 10 | 90 | 4 | 4.4 | 0.4 | D |
| Comparative Example 4 | 10 | 10 | 4.4 | 6.3 | 1.9 | B |
| Comparative Example 5 | — | — | 4.2 | 8.4 | 4.2 | C | result, even if a variation in height of the partition 35 or a variation in thickness of the molecule X coating layer 42 occur, the protective film 37 can absorb these variations, such that the top portion 35b of the partition 35 can reliably contact the molecule X coating layer 42.

As a method of forming a protective film 37 on a counter substrate 52, for example, a solution is dissolved in the solvent for dissolving the constituent material, and the solution is uniformly applied to form a film. For example, the solution can be applied using a die coater or a comma coater. Examples of the solvent include an aliphatic hydrocarbon such as pentane, hexane, or octane, an alicyclic hydrocarbon such as cyclohexane or methylcyclohexane, an aromatic hydrocarbon such as benzene (alkylbenzene derivative) having a long chain alkyl group such as benzene, toluene, xylene, hexylbenzene, heptylbenzene, octylbenzene, nonylbenzene, decylbenzene, undecylbenzene, dodecylbenzene, tridecylbenzene, or tetradecylbenzene, an aromatic hydrocarbon such as pyridine, pyrazine, furan, pyrrole, thiophene, and methyl pyrrolidone, an ester such as methyl acetate, ethyl acetate, butyl acetate, or ethyl formate, an ketone such as acetone, methyl ethyl ketone, diethyl ketone, methyl isobutyl ketone, methyl isopropyl ketone, or cyclohexane, a nitrile such as acetonitrile, propionitrile, or acrylonitrile, an amide such as N,N-dimethylformamide or N,N-dimethylacetamide, a carboxylate, or other various oils, and the like, and these can be used singly or as a mixture. In this embodiment, the toluene is used.

In addition, an elastic modulus of the protective film 37 at room temperature is preferably from 0.1 MPa to 50 MPa, and in the present embodiment, the elastic modulus at room temperature is 20 MPa. By setting the elastic modulus of the protective film 37 to be within such a range, the elastic modulus of the laminated body, that is, the protective film 37 and the molecule X coating layer 42 as a whole is set to be within an appropriate range, such that the top portion 35b of the partition 35 can contact or intrude into the whole surface of the molecule X coating layer 42 and the thermal expansion and thermal contraction of the electrophoretic layer 33 is accompanied according to the change in temperature, thereby providing a electrophoretic display device 10a with high reliability.

The average thickness of the protective film 37 is preferably from 2.5 μm to 20 μm, and is 12.5 μm in the present embodiment. As a result, the top portion 35b of the partition 35 can reliably intrude into the molecule X coating layer 42 and the protective film 37.

Hereinabove, while the preferred embodiments of the invention have been described with reference to the accompanying drawings, it goes without saying that the invention is not limited to these examples. The shapes and combinations of the constituent members shown in the above examples are merely examples and various modifications can be variously changed based on design requirements or the like without departing from the gist of the invention.

DESCRIPTION OF THE REFERENCE NUMERALS 10, 10a: Electrophoretic display device
11: Pixel
12: Data lines
13: Scanning lines
14: Seal portion
14a: First sealing material
14b: Second sealing material
15: Dispersion medium
16: TFT (transistor)
21: Pixel electrode
22: Common electrode
31: First base member
32: Insulating layer
33: Electrophoretic layer
34: Electrophoretic particles
35, 35a: Partition
35b: Top portion
36: Cell
37: Protective film
41: Second base member
42: Molecule X coating layer
51: Element substrate
52: Counter substrate
61: Frame partition
71: Core particle
72: Siloxane-based compound
73: Polymerization portion
74: Siloxane bonding portion
100: Electronic apparatus
110: Operation unit
D: Dummy pixel region
E: Display region
E1: Frame region
W1, W2, W3: Width

The invention claimed is:

1. An electrophoretic display device, comprising:
a first substrate;
a second substrate disposed to face the first substrate;
a molecule X provided between the first substrate and the second substrate; and
an electrophoretic dispersion liquid comprising electrophoretic particles and a dispersion medium, wherein the electrophoretic dispersion liquid is disposed between the first substrate and the molecule X,
wherein the molecule X is bonded onto the surface of the second substrate, and
wherein the molecule X comprises an aromatic ring having a cyclic structure, and the aromatic ring comprises any one of benzene, toluene, xylene, mesitylene, pyridine, pyrrole, thiophene, acetophenone, aniline, anisole, benzaldehyde, benzyl alcohol, benzylamine, fluorobenzene, bromobenzene, dibromobenzene, chlorobenzene, dichlorobenzene, phenol, furfural, bromoaniline, nitrobenzene, nitrotoluene, toluidine, naphthalene, anthracene, naphthacene, pentacene, benzopyrene, chrysene, pyrene, triphenylene, corannulene, coronene, and ovalene.

2. The electrophoretic display device according to claim 1, wherein a refractive index of the molecule X is from 1.5 to 3.0.

3. The electrophoretic display device according to claim 1, wherein the molecule X is arranged on the second substrate at a ratio of from 1 molecule/10 $nm^2$ to 10 molecules/10 $nm^2$.

4. The electrophoretic display device according to claim 1, wherein the electrophoretic particle comprises at least one color particle.

5. The electrophoretic display device according to claim 1, wherein the electrophoretic particle also comprises the molecule X.

6. The electrophoretic display device according to claim 5, wherein a weight fraction of the molecule X included in the electrophoretic particles is from 20% to 80%.

7. The electrophoretic display device according to claim 1, wherein a protective film is provided between the second substrate and the molecule X.

8. An electronic apparatus comprising the electrophoretic display device according to claim 1.

9. The electrophoretic display device according to claim 1, wherein the X molecule is a polymer.

10. The electrophoretic display device according to claim 9, wherein the polymer X molecule is covalently bonded onto the surface of the second substrate.

11. The electrophoretic display device according to claim 1, wherein the electrophoretic dispersion liquid comprises two types of charged electrophoretic particles having opposite charge polarity.

12. The electrophoretic display device according to claim 5, wherein the molecule X of the electrophoretic particle is a polymer.

13. The electrophoretic display device according to claim 12, wherein the polymer molecule X is bonded onto the surface of the electrophoretic particle.

* * * * *